No. 764,604. PATENTED JULY 12, 1904.
F. LAMBERT.
WATER METER.
APPLICATION FILED MAY 10, 1902.
NO MODEL.
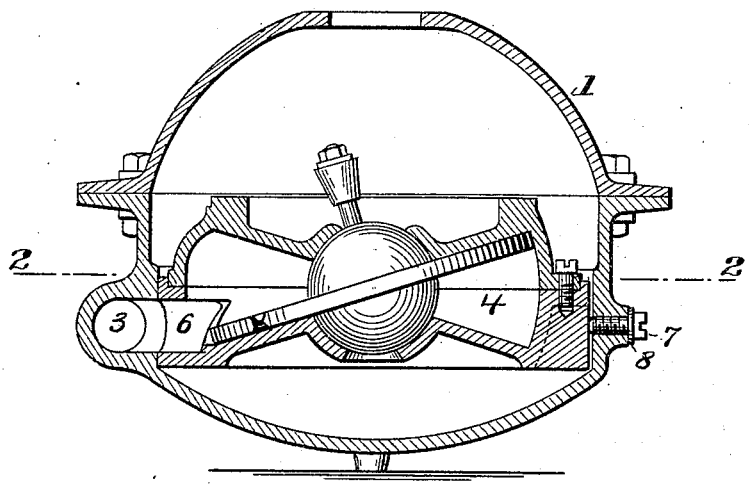
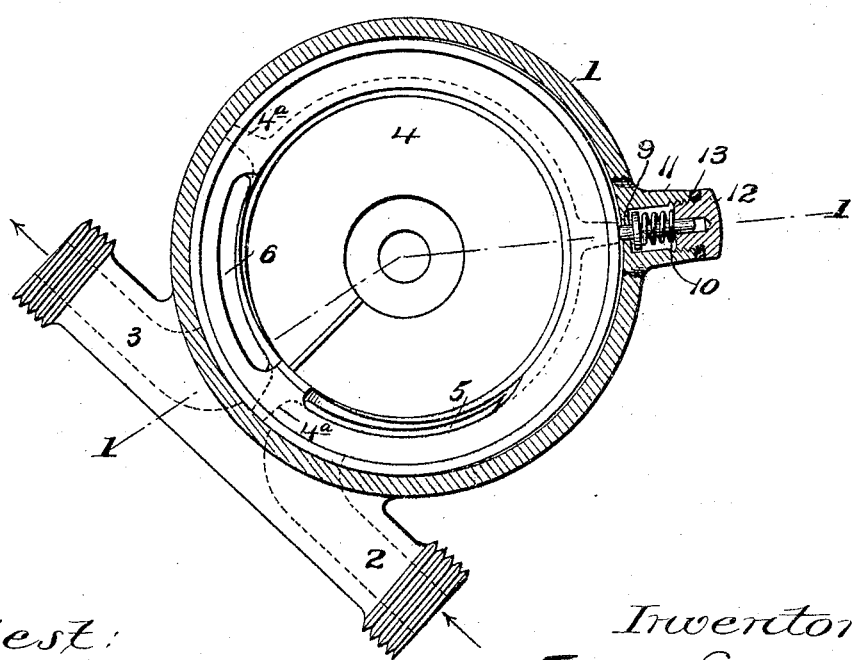
Attest:
Geo H Botts
Mabelle F. Lake
Inventor:
Frank Lambert
By Edith J. Griswold
Atty.

No. 764,604. Patented July 12, 1904.

UNITED STATES PATENT OFFICE.

FRANK LAMBERT, OF BROOKLYN, NEW YORK.

WATER-METER.

SPECIFICATION forming part of Letters Patent No. 764,604, dated July 12, 1904.

Application filed May 10, 1902. Serial No. 106,731. (No model.)

*To all whom it may concern:*

Be it known that I, FRANK LAMBERT, a citizen of the United States, and a resident of New York city, borough of Brooklyn, Kings county, State of New York, have invented Improvements in Water-Meters, of which the following is a specification.

This invention relates to water-meters, and has for its object to simplify and cheapen the manufacture of meters having a measuring-chamber fitted at its periphery within a pressure-casing. In such meters the measuring-chamber must be so fitted in a bore in the casing that the chamber forms a water-tight means of separation between the inlet and outlet ports of the casing except through this measuring-chamber. A very inconvenient feature of this construction is that the chamber must truly fit the bore in the casing without binding, which necessitates such exactness that the manufacture is difficult and costly, and even then these parts are seldom interchangeable. By my present invention I make the measuring-chamber slightly smaller than the bore of the casing—say from two to five thousandths of an inch smaller in diameter—so that it is freely fitted in the bore, and I provide means for forcing or maintaining the said chamber at one of its ports in close contact or fit with the casing at the corresponding port of the casing.

In the accompanying drawings I have shown the application of my invention; but I do not limit myself to any particular form of construction beyond what is set forth in the appended claims.

Figure 1 is a vertical section, and Fig. 2 a sectional plan, of one form of meter illustrating the principle of my invention, Fig. 1 showing one detail form of means for maintaining contact between the measuring-chamber and casing and Fig. 2 showing another detail form of such means. Fig. 1 is represented as taken through line 1 1 of Fig. 2, and Fig. 2 as taken through line 2 2 of Fig. 1 except as to these detail parts.

Referring to the drawings, the casing 1 is provided with inlet-port 2 and outlet-port 3, and the measuring-chamber 4 is provided with inlet-ports 5 and outlet-port 6. To illustrate the principle of my invention, the drawings show the proportionate measurements of the bore of casing 1 and the periphery of the measuring-chamber 4 somewhat exaggerated; but the difference in the measurements need only be sufficient to make sure that the measuring-chamber will fit into the bore freely and so that in the manufacture these measuring-chambers and casings may be made interchangeable without any extra fine fitting. It is necessary that at least one of the sets of ports—that is, either the corresponding inlet-ports of the casing and measuring-chamber or the corresponding outlet-ports—have a water-tight communication. I have shown in the drawings the casing and measuring-chamber fitting closely together in a water-tight manner at the outlet-ports 3 and 6 by having the measuring-chamber 4 forced against the casing at the periphery around the outlet-port— that is, the chamber is made to take an eccentric position in the bore of the casing—and the diameters of the chamber and bore being so nearly alike a water-tight fit will be made for a considerable arc of the adjacent peripheries. Even with the exaggerated eccentricity shown such arc extends past the ribs 4$^a$, Fig. 2, that act as walls each side of the outlet-port 6.

Any suitable means may be employed for forcing or maintaining the chamber in its eccentric position against the casing. As shown in Fig. 1, a screw 7, threaded through the wall of the casing, is made to bear against and push the chamber 4 at the side diametrically opposite the outlet-ports. A packing-gasket 8 compressed between the head of the screw and the outside of the casing prevents leakage. By making the gasket 8 thick enough and of elastic or plastic material the gasket will act as a means of adjustment for the screw 7, so that the inner end of the screw may be brought in close contact with the chamber preferably without binding and the chamber may be freely inserted or removed without loosening the screw 7.

Fig. 2 shows an elastic device for forcing the chamber against the casing at the proper place, consisting of a spring-actuated rod 9, entering the casing, the spring 10 and the shouldered rod 9 being housed in a hollow lug 11 on the casing, which is closed by the guide and compression plug or cap 12 and made water-tight by a packing 13, compressed between the lug and flange of the plug 12.

I claim as my invention—

1. In a water-meter, the combination of a casing having inlet and outlet ports, and a measuring-chamber having inlet and outlet ports and being freely fitted at its periphery in a bore in the said casing, with means for maintaining the said chamber at one of its ports in close contact with the casing at the corresponding port of the casing.

2. In a water-meter, the combination of a casing having inlet and outlet ports, and a measuring-chamber having inlet and outlet ports and being freely fitted in said casing, with elastic means for forcing said chamber into contact with one side of said casing.

In testimony whereof I have signed my name to this specification in the presence of two subscribing witnesses.

FRANK LAMBERT.

Witnesses:
EDITH J. GRISWOLD,
MABELLE F. LAKE.